United States Patent [19]

Horvath

[11] Patent Number: 4,756,826
[45] Date of Patent: Jul. 12, 1988

[54] TANK FILTRATION SYSTEM

[76] Inventor: Eugene P. Horvath, 1011 Alberta St., Longwood, Fla. 32750

[21] Appl. No.: 514,654

[22] Filed: Jul. 18, 1983

Related U.S. Application Data

[63] Continuation-in-part of Ser. No. 282,759, Jul. 13, 1981, abandoned.

[51] Int. Cl.$^4$ .............................................. B01D 35/02
[52] U.S. Cl. .................... 210/167; 210/172; 210/196; 210/232; 210/247; 210/416.1; 210/434; 210/460; 210/DIG. 17; 415/121 G
[58] Field of Search ............... 210/167, 168, 169, 196, 210/197, 247, 405, 416, 434, 456, 460, 519, 520, 232, 239, 240, 350, 452, 489, 172, DIG. 17; 415/121 G; 261/3, 4, 124, DIG. 75; 282/759

[56] References Cited

U.S. PATENT DOCUMENTS

| | | | |
|---|---|---|---|
| 2,137,397 | 11/1938 | Haldeman | 210/288 X |
| 2,822,145 | 2/1958 | McLean | 416/185 |
| 3,160,000 | 12/1964 | Mosher | 210/232 X |
| 3,160,588 | 12/1964 | Alarie | 210/167 X |
| 3,237,872 | 3/1966 | Mincy | 239/587 X |
| 3,273,717 | 9/1966 | Canterbury | 210/416.2 X |
| 3,356,218 | 12/1967 | Grudoski | 210/241 |
| 3,630,373 | 12/1971 | Grazen | 210/416.1 X |
| 3,651,607 | 3/1972 | Lee, II | 210/247 X |
| 3,904,393 | 9/1975 | Morse | 261/4 X |
| 4,163,035 | 7/1979 | Gursky | 210/169 X |
| 4,271,025 | 6/1981 | Erdmannsdorfer | 210/489 X |
| 4,280,906 | 7/1981 | Liljegren | 210/282 |

OTHER PUBLICATIONS

Perry, Robert H. et al., Chemical Engineer's Handbook, 1973, 5th Edition, McGraw Hill Book Co., N.Y., pp 23–60 and 23–61.

Primary Examiner—Richard V. Fisher
Assistant Examiner—W. Gary Jones
Attorney, Agent, or Firm—William M. Hobby

[57] ABSTRACT

A tank filtration and dispersion system is provided for use in tanks containing liquid chemicals for filtering, agitating and dispersing the liquid. A housing has an electric motor attached thereto and connected to an impeller located in the housing for rotation upon actuation of the electric motor. A filter is removably attached to the housing and a fluid output is provided for dispersing the fluid drawn through the filter responsive to the actuation of the impeller. The output has a dispersion tube in the tank. A separate dispersion output may be is provided having a venturi and a spaced aspiration sleeve therearound. The impeller has vanes with flat leading edges and curved trailing edges to enhance pumping action.

8 Claims, 3 Drawing Sheets

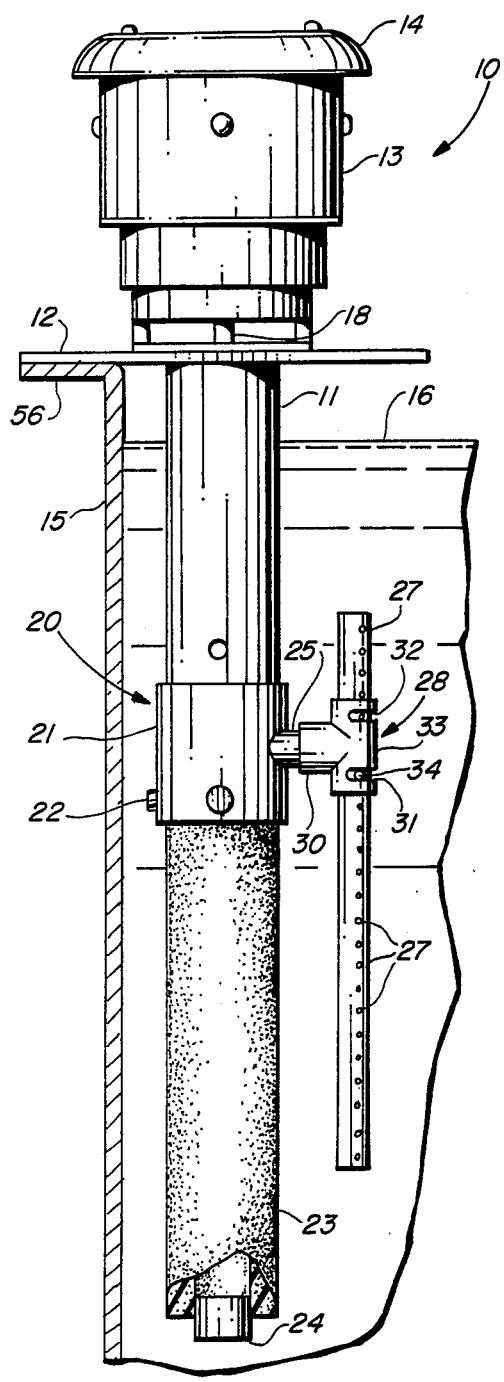
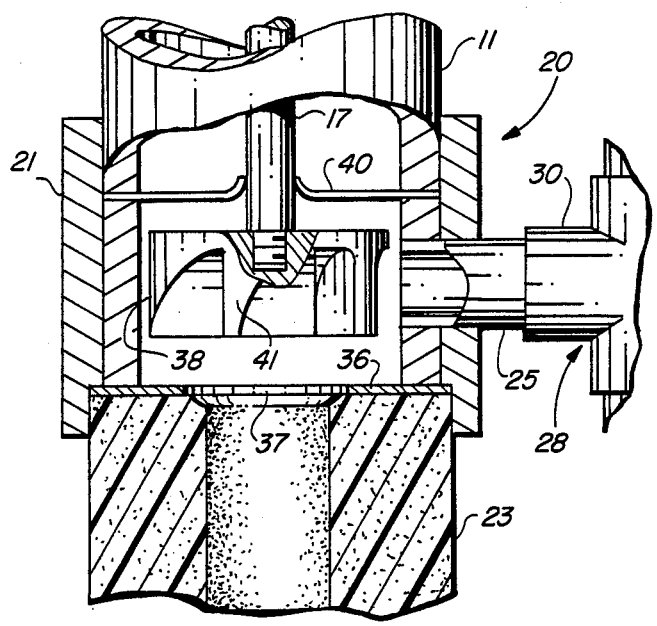
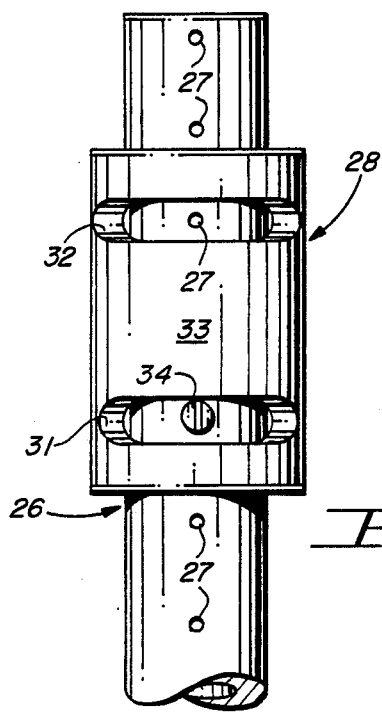
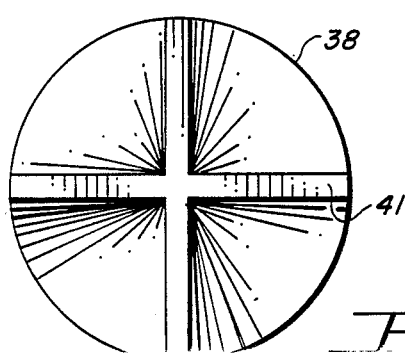
FIG. 1  
FIG. 2  
FIG. 3  
FIG. 5

TANK FILTRATION SYSTEM

BACKGROUND OF THE INVENTION

The present invention relates to a tank filtration system and especially to systems for attaching to a chemical tank for filtering, agitating and dispersing the chemicals in the tank. This application is a continuation-in-part of my prior application, Ser. No. 282,759 for tank filtration system, filed July 13, 1981 and now abandoned.

In the past, a variety of submerged filter systems have been provided for use in chemical and other tanks. Typical prior art systems have had a bracket arrangement for attaching the filter systems to the side of a chemical tank and include an electric motor attached to the bracketing system. The electric motor is attached to the filter and pumping system to drive an impeller operated pump and an enclosed filter is attached to the pump to push the liquid therethrough for discharge, from the outlet. The filtered liquid is discharged out the filter discharge opening or mayhave a flexible tube attached thereto.This type of pump requires the use of materials resistent to the chemicals that are being filtered and are typically made of a polymer housing, such as PVC (poly vinyl chloride). The impeller and drip cover may be made of a corrosion resistant polymer. The cover usually is disc shaped and mounted to the top of the motor to prevent chemicals from splashing into the cooling openings of the motor housing.

Typical prior art U.S. patents can be seen in the patents to Grudoski, U.S. Pat. No. 3,356,218; Haldeman, U.S. Pat. No. 2,137,397; Grazen, U.S. Pat. No. 3,630,373; and Canterbury, U.S. Pat. No. 3,273,717. The present invention is directed towards a simplified filter and dispersion system for use with chemical tanks and especially to an improved dispersion and pumping system.

SUMMARY OF THE INVENTION

A tank filtration and dispersion system is provided having a housing, an electric motor attached to the housing and an impeller located in the housing to form a pump. The impeller is connected to the electric motor for rotation responsive to the operation of the motor. A filter is attached to the housing and the housing has a fluid output extending from a position adjacent the impeller. To this combination is added a dispersion tube attached to the fluid output which has a plurality of openings therein and a supporting sleeve for holding the dispersion tube to the fluid output. The dispersion tube support sleeve has at least one arcuate slot to form a track for a guide member attached to the tube to thereby allow the tube to be rotated to vary the position of the openings therein. The dispersion tube may also be rotated on the output to further vary the position of the holes in the tube. The pump portion of the filter system uses an impeller connected to the motor shaft in which the impeller has a plurality of vanes, each vane having a flat side, or top edge and a curved side curving from the top edge of one vane to the flat side of the next adjacent vane.

BRIEF DESCRIPTION OF THE DRAWINGS

Other objects, features and advantages of the present invention will be apparent from the written description and the drawings, in which:

FIG. 1 is a side perspective view of a chemical filtration system in accordance with the present invention;

FIG. 2 is a partial sectional view of the pump part of the filtration system of FIG. 1;

FIG. 3 is a partial elevation of the dispersion tube;

FIG. 5 is a bottom elevation of the impeller for the pump filtration system of FIG. 1;

DESCRIPTION OF THE PREFERRED EMBODIMENTS

Figure 4:
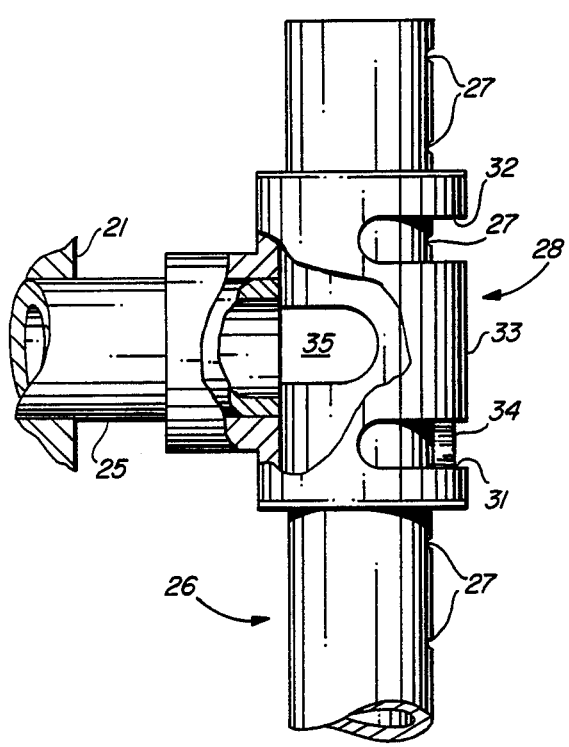
FIG. 4 is another partial elevation of the dispersion tube.

Referring to the drawings, and especially to FIGS. 1 through 7, a chemical filtration and dispersion system 10 includes a housing 11 having a motor base portion 12 having an electric motor 13 mounted thereon. Electric motor 13 has a disc shaped cover 14 attached to the top thereof and extending over the sides of the electric motor 13. The filtration system 10 is shown mounted adjacent to a chemical tank 15 having a chemical 16 therein. The housing 11 has a shaft 17 attached to the electric motor shaft 18 of the motor 13 extending through the elongated cylindrical portion of the housing 11 to the pump area 20. The pump area 20 has a sleeve 21 having an impeller thereinside and threaded attaching members 22 for locking onto a filter 23 on the sleeve 21. The filter 23 may be of any type, such as made from polymers like poly-propylene or from cotton, Teflon, carbon (filter mediums), and are made into filters having hollow centers therein. A stopper blocking member 24 has been added to one end of the filter. By attaching the open filter 23 to the sleeve 21, a filter of any size desired can be used with filtration system 10. In addition, the end blocking member 24 can be inserted or removed to increase the flow and reduce the filtration or decrease the flow and increase the filtration by its removal or addition to the filter. The chemical 16 is pumped through the filter 23, through the pump 20, and out the output 25 into a dispersion tube 26 having a plurality of openings 27 acting as dispersion nozzles. The dispersion tube 26 is blocked at either end thereof and is supported by support member 28 shaped generally like a T-joint having a threaded T-portion 30 connected to the output 25 and mounted to allow rotation on the output 25. A slot 31 and slot 32 are cut approximately 180° around the portion 33 of the T-joint 28 and a pin 34 has been inserted in one of the openings 27 by a press fit to thereby provide a guide support for riding in the slot or track 31. The slot 32, on the other hand, has an opening therein and does not require a separate press fit pin. Thus, the dispersion tube 26 can be rotated in the support member 28 until the pin 34 engages either end of the slot 31. In this connection, the dispersion tube 26 portion located adjacent the opening from the T-joint 30 has a slot portion cut therein to allow liquid to enter at any point of the dispersion tube 26.

As can be seen, dispersion tube 26 can be rotated approximately 180° in the embodiment shown in FIG. 1 to position the openings 27 around a 180 portion of a circle. In addition, the support bracket 28 can be rotated on the output 25 to position the dispersion tube 26 in a different direction as desired, thereby allowing greater flexibility to the dispersion of the fluid flowing through the filter 23 and through the pump 20. The slot 35 can be partially seen in the cutaway view in FIG. 4, so that a continuous opening is provided between the output 25 and the tube 26.

The operation of the pump 20 can be more clearly seen in connection with FIG. 2, having the filter 23 attached thereto against the flow plate 36 having an opening 37 therein. The impeller 38 is attached to the shaft 17 extending from the electric motor 13 and has a threaded tip threaded into the end of the impeller 38. The seal 40 is mounted around the shaft 17 just above the impeller 38. The output 25 is connected through the sleeve 21 adjacent the impeller 38. The impeller has a plurality of vanes 41, as more clearly shown in connection with FIGS. 5, 6 and 7.

Each vane 41 has a leading edge flat surface 42, a top edge 43, and a trailing edge curved portion 46 having a concave curve from the top edge 43 of the vane 41 to the flat edge 42 of the next adjacent vane. The impeller is of a generally cylindrical shape having portions removed to create the particular shape. Looking at the impeller rear side 44 in FIG. 7, the impeller is flat having a threaded center portion 45 for attaching the impeller to the end of the shaft 17.

Figure 6:
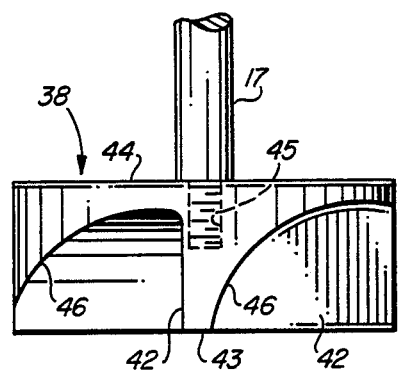
FIG. 6 is a side elevation of the impeller of FIG. 5.
Figure 7:
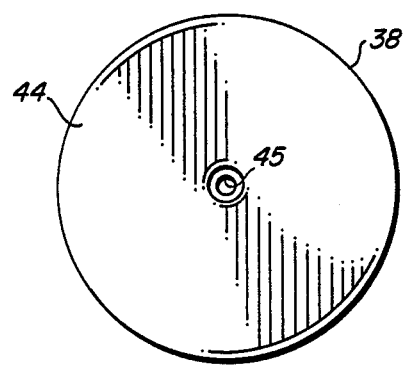
FIG. 7 is a bottom elevation of the impeller of FIGS. 5 and 6.

The embodiments shown in FIGS. 5, 6 and 7 show the use of four vanes, but it to should be clear that any number of vanes, such as one, two, three, four or more, can be utilized without departing from the spirit and scope of the invention.

Figure 8:
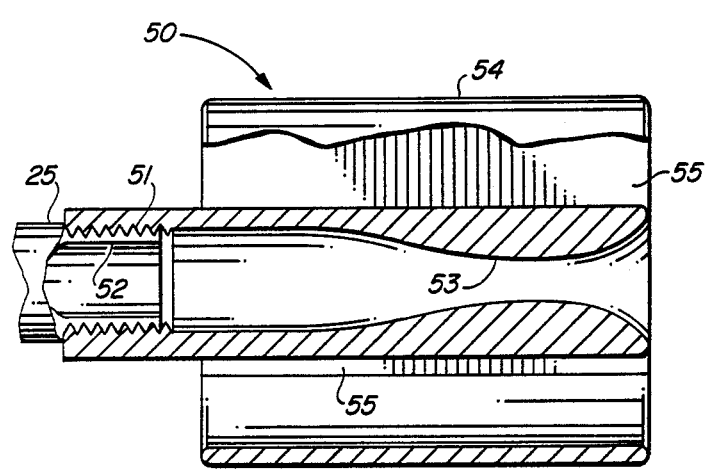
FIG. 8 is a sectional view of a second embodiment of a dispersion tube.
Figure 9:
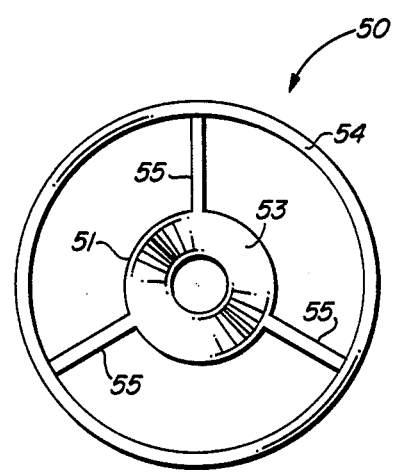
FIG. 9 is an end elevation of the dispersion tube of FIG. 8.

Turning now to FIGS. 8 and 9, a second embodiment of a dispersion tube 50 is shown having a central tube 51 having an internally threaded portion 52 for fitting onto the output tube 25 which has external threads thereon. The tube 51 has a venturi 53 formed therein and a cylindrical sleeve mounted around the exterior of the tube 51 to create a pattern by the increased velocity of the flow through the venturi 53. The sleeve 54 is supported by three support arms 55 to provide a totally different flow pattern from that of the dispersion tubes shown in FIGS. 1, 3 and 4.

It should be clear at this point that a filtration system for chemical tanks has been illustrated which uses standard commercial electric motors and has a housing 11 which may be made of polymer materials, such as the seal 40 and a seal just below the electric motor 13, which may be made of PVC or may be made with a polytetrafluoroethylene of Telfon disc having self-lubricating properties in contact with the motor shaft 17. The materials, of course, are determined by the chemical the filtration system is to be used in, since most of the filtration system is submerged in the chemical. The filtration system may be attached to the tank, as shown in FIG. 1, with a standard C-clamp, or the like, holding the tank flange 56 to the motor support 12.

Figure 12:
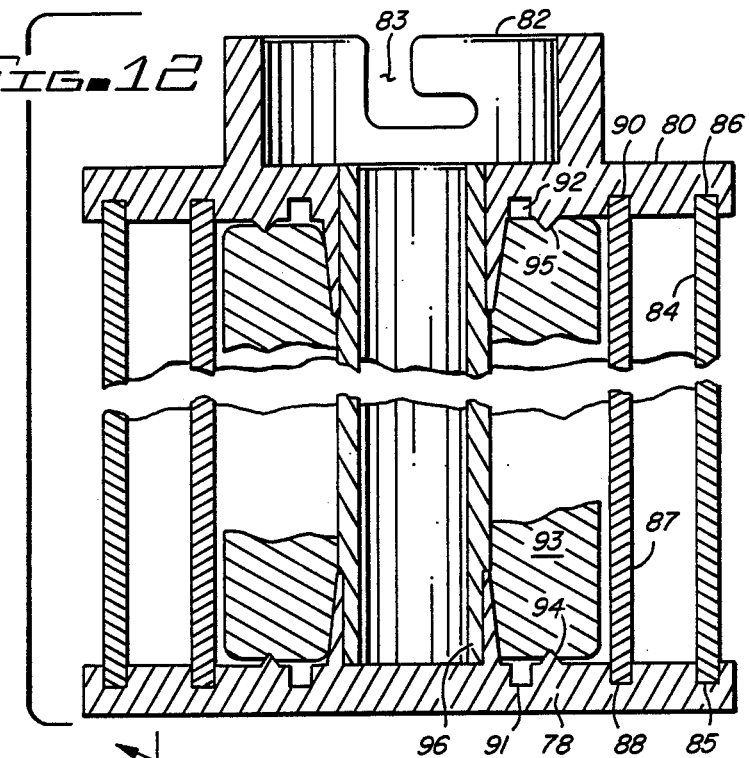
FIG. 12 is a sectional view of the filter of FIG. 10.
Figure 10:
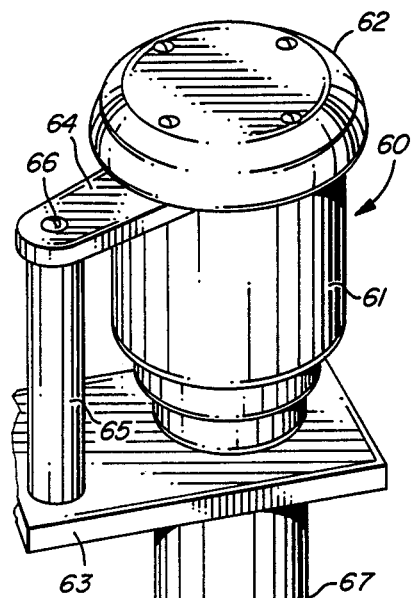
FIG. 10 is a side perspective view of an alternate embodiment in accordance with the present invention.
Figure 10:
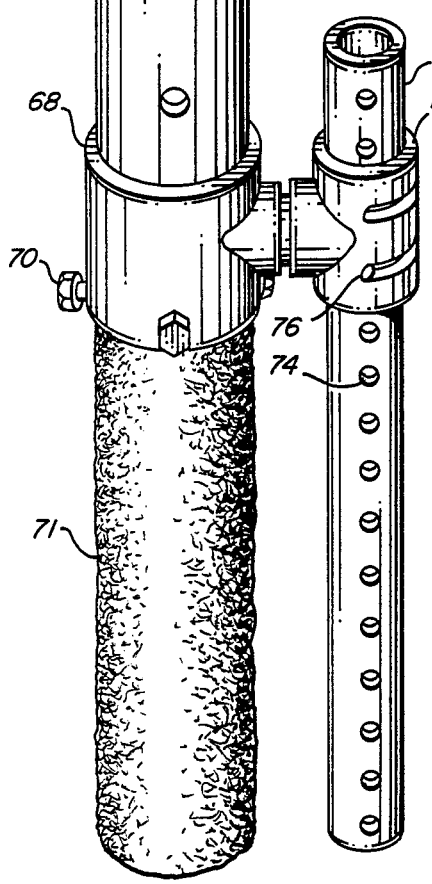
Figure 10:
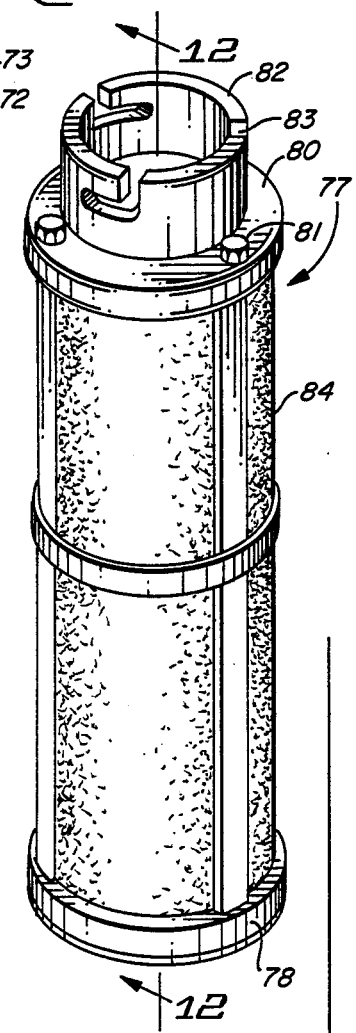
Figure 11:
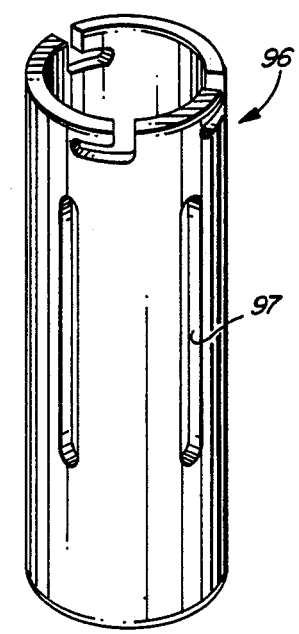
FIG. 11 is a side elevation of the center tube of the filter of FIG. 10.

Turning now to FIGS. 10, 11 and 12, another embodiment of a tank filtration system 60 is illustrated having an electric motor 61 with a dish shaped cover 62 and a motor and handle supporting base 63. An upper handle support 64 has been added, as well as a handle 65 held by threaded fastener 66. In the past, tank filtration systems have sometimes been dropped when workmen attempted to pick up the system by the motor while it was hot. The handle 65 is firmly attached between the base 63 and the support 64 and allows the insulated handle 65 to be readily grasped for installing or removing the filter system 60. A filtration system 60 has a housing 67 having a sleeve 68 attached thereto, as in the prior embodiment, and a plurality of threaded filter attaching members or bolts 70. The bolts can hold a filter 71 thereto by being threaded onto the filter 71, which has been slipped into the sleeve 68. This embodiment also has a T-joint 72 along with a dispersion tube 73 with a plurality of nozzles 74. T-joint 72 has a pair of slots 75 and a guide pin 76.

An alternate filter 77 has a lower based portion 78 and an upper filter portion 80. Filter portions 78 and 80 are held together by elongated bolt members 81. The upper filter portion 80 has a filter attaching portion 82 having a plurality of bayonet slots 83, which advantageously attach to the threaded attaching members 70 normally used to hold a filter 71 when retracted. The filter 77 can be bayonet locked onto the outside of the sleeve 68 onto the bolt 70. The filter 77 has an outer core filter element 84 which can be held in annular slots 85 in the base 78 and 86 and the top support 80 and an intermediate filter 87 held in annular grooves 88 in the base 78 and 90 in the filter support member 80. A third finer filter element can be held in the annular grooves 91 and 92, or alternatively, filterelements can be left out and a filter element 93 placed therein supported by lower pointed members 94 and upper pointed members 95.

A center element or rigid tube 96 can be a hollow tube, as shown in FIG. 11, with a plurality of slots 97 therein, or alternatively, can be another filter element. The filter element 77 advantageously can be taken apart by removing the elongated bolts 81 and then adding filter elements, as shown in FIG. 12, or alternatively filling the space between two of the filter elements with charcoal to adapt the filter for a particular filtering job filtering a particular liquid or plating compound so that the filter can be quickly modified for different chemical compounds. For instance, the filter element 86 can be removed to fill the entire space with granular charcoal, if desired. This embodiment provides the advantage of an easily modified filter which can be quickly attached to the sleeve 68 with the bolts 70 when the filter 71 is removed or alternatively the filter 77 can be removed and the filter 71, which is a readily available mesh filter, can be inserted inside the sleeve and locked with the bolt 70. The handle 65, which is made of an insulating material, such as wood or a polymer, allows the system to be quickly removed or reinserted into a plating tank.

Accordingly, the present invention is not to be construed as limited to the particular forms shown, which are to be considered illustrative rather than restrictive.

I claim:

1. In a tank filtration system having:
    a housing, said housing having a motor base and an electric motor attached to the housing motor base, said electric motor having a handle bracket attached hereto;
    a filter;
    an impeller located in the housing and operatively connected to the electric motor for rotation responsive to the operation of the electric motor;
    filter attaching means for attaching the filter to said housing, said filter attaching means having a plurality of threaded fasteners positioned for attaching a bayonet fastener filter element to said fasteners, said threaded fasteners also positioned for bolting onto a filter element, whereby different filter elements can be attached with said filter attaching means threaded fasteners;

fluid output means in said housing adjacent said impeller, whereby fluid can be moved by said impeller through said filter and out the fluid output means by said impeller, said fluid output means having a dispersing tube for dispersing fluid moving through said fluid output means; and a handle attached between said housing motor base and an electric motor handle bracket for supporting said handle therebetween, whereby said tank filtration system can be supported by said handle while attaching or removing the filtration system from a filtration tank.

2. A tank filtration system in accordance with claim 1, in which said handle is of a heat insulating material.

3. A tank filtration system in accordance with claim 1, in which said filter has an upper and lower support portion, each portion having a plurality of annular grooves therein for holding a plurality of filter elements therebetween.

4. A tank filtration system in accordance with claim 3, in which said filter upper and lower portions are held together with elongated fastener members, whereby the upper and lower filter portions can be rapidly disassembled and the filter elements supported therebetween replaced with other filter elements.

5. A tank filtration system in accordance with claim 4, in which said filter has a rigid center tube between said upper and lower filter elements for holding said upper and lower filter elements thereto and said center tube has a plurality of openings therethrough.

6. A tank filtration system in accordance with claim 5, in which said filter has a plurality of pointed members attached to the upper and lower portions thereof for supporting a filter element therebetween.

7. A tank filtration system in accordance with claim 1, in which said impeller has a plurality of vanes, each vane being attached to a circular base which base is operatively attached to said electric motor and each of said plurality of vanes has a flat side, a top edge and a curved side along the circumference of said circular base curving from the top edge of one vane to the flat side of the next adjacent vane.

8. A tank filtration system in accordance with claim 1, in which said filter attaching means includes means for attaching a filter having a center bore, said filter having a removable blocking means for one end of the center bore of said filter, whereby flow through said tank filtration system can be varied by attaching or removing said blocking means.

* * * * *